(12) United States Patent
Pentico et al.

(10) Patent No.: US 6,899,432 B2
(45) Date of Patent: May 31, 2005

(54) COLOR MANAGEMENT SYSTEM HAVING A TRANSMISSIVE PANEL AND OPTICAL ISOLATOR

(75) Inventors: Clark Pentico, Simi Valley, CA (US); Michael Newell, Thousand Oaks, CA (US)

(73) Assignee: Advanced Digital Optics, Inc., Westlake Village, CA (US)

( * ) Notice: Subject to any disclaimer, the term of this patent is extended or adjusted under 35 U.S.C. 154(b) by 0 days.

(21) Appl. No.: 10/431,890

(22) Filed: May 8, 2003

(65) Prior Publication Data

US 2003/0193652 A1 Oct. 16, 2003

Related U.S. Application Data

(63) Continuation-in-part of application No. 10/310,383, filed on Dec. 5, 2002, which is a continuation-in-part of application No. 10/213,505, filed on Aug. 6, 2002.
(60) Provisional application No. 60/378,879, filed on May 8, 2002, and provisional application No. 60/310,077, filed on Aug. 6, 2001.

(51) Int. Cl.[7] .............................................. G03B 21/28
(52) U.S. Cl. ........................................ 353/31; 353/20
(58) Field of Search ............................... 353/20, 31, 33, 353/34, 37, 81; 349/5, 7, 9

(56) References Cited

U.S. PATENT DOCUMENTS

| 3,637,308 A | 1/1972 | Van Raalte et al. |
| 3,868,168 A | 2/1975 | De Veer |
| 3,982,819 A | 9/1976 | Letellier |
| 4,864,390 A | 9/1989 | McKechnie et al. |
| 5,231,431 A | 7/1993 | Yano et al. |
| 5,268,775 A | 12/1993 | Zeidler |
| 5,295,009 A | 3/1994 | Barnik et al. |
| 5,315,330 A | 5/1994 | Hamada |
| 5,327,289 A | 7/1994 | Watanabe et al. |
| 5,374,968 A * | 12/1994 | Haven et al. .................. 353/31 |
| 5,486,881 A | 1/1996 | Hwang |
| 5,552,922 A | 9/1996 | Magarill |

(Continued)

FOREIGN PATENT DOCUMENTS

| EP | 0 658 794 | 6/1995 |
| WO | 99/19758 | 4/1999 |
| WO | 00/63738 | 10/2000 |
| WO | 01/37030 | 5/2001 |
| WO | 01/50178 | 7/2001 |
| WO | 01/72048 | 9/2001 |

OTHER PUBLICATIONS

Written Opinion, PCT/US02/25101 dated Apr. 17, 2003, 6 p.
Notification of Transmittal of International Search Report, International Search Report for PCT/US 03/14887, dated May 8, 2003.

Primary Examiner—William C. Dowling
(74) Attorney, Agent, or Firm—Snell & Wilmer LLP

(57) ABSTRACT

A color management system for use with projection displays includes, for example, two or more analyzers positioned to receive light beams emitted from corresponding image assimilators, which each comprise a transmissive panel and a polarizing beamsplitter. Each analyzer is positioned to receive a light beam directly from an associated image assimilator before the light has passed through another optical element such as a light combiner. The analyzers are configured for producing filtered light outputs with improved contrast relative to the incoming light beams. These closely-coupled analyzers are able to remove substantially all of the noise before it has become indistinguishable, on the basis of polarization, from the light that comprises the desirable image. In an exemplary embodiment, an optical isolator is positioned to receive both a light output from a color management system and a reflection of the light output. The optical isolator is configured for isolating the light output from the reflection.

52 Claims, 5 Drawing Sheets

U.S. PATENT DOCUMENTS

| | | | |
|---|---|---|---|
| 5,562,334 | A | 10/1996 | Wortel |
| 5,621,486 | A | 4/1997 | Doany et al. |
| 5,658,060 | A | 8/1997 | Dove |
| 5,701,203 | A | 12/1997 | Watanabe |
| 5,917,561 | A | 6/1999 | Hatanaka |
| 5,946,114 | A | 8/1999 | Loiseaux et al. |
| 5,973,759 | A | 10/1999 | Itoh et al. |
| 6,120,153 | A | 9/2000 | Ohta |
| 6,176,585 | B1 | 1/2001 | Koyama et al. |
| 6,176,586 | B1 * | 1/2001 | Hirose et al. ................. 353/31 |
| 6,183,090 | B1 * | 2/2001 | Nakanishi et al. ............ 353/20 |
| 6,183,091 | B1 | 2/2001 | Johnson et al. |
| 6,231,190 | B1 | 5/2001 | Dewald |
| 6,234,634 | B1 | 5/2001 | Hansen et al. |
| 6,273,568 | B1 | 8/2001 | Okuyama |
| 6,309,071 | B1 * | 10/2001 | Huang et al. ................. 353/31 |
| 6,384,972 | B1 | 5/2002 | Chuang |
| 6,419,362 | B1 * | 7/2002 | Ikeda et al. .................... 353/20 |
| 6,454,416 | B2 * | 9/2002 | Aoto et al. .................... 353/31 |
| 6,457,831 | B1 * | 10/2002 | Chuang et al. ............... 353/33 |
| 6,490,087 | B1 | 12/2002 | Fulkerson et al. |
| 6,513,934 | B1 * | 2/2003 | Okuyama .................... 353/31 |
| 6,601,957 | B2 * | 8/2003 | Sugawara .................... 353/31 |
| 6,624,862 | B1 | 9/2003 | Hayashi et al. |
| 6,626,540 | B2 * | 9/2003 | Ouchi et al. .................. 353/31 |
| 6,661,475 | B1 * | 12/2003 | Stahl et al. .................... 349/9 |
| 6,678,015 | B2 | 1/2004 | Yi et al. |
| 6,685,322 | B2 | 2/2004 | Sawamura et al. |
| 2002/0105602 | A1 | 8/2002 | Pan |
| 2002/0171809 | A1 | 11/2002 | Kurtz et al. |
| 2002/0191289 | A1 | 12/2002 | Chuang |

* cited by examiner

US 6,899,432 B2

COLOR MANAGEMENT SYSTEM HAVING A TRANSMISSIVE PANEL AND OPTICAL ISOLATOR

CROSS REFERENCE TO RELATED APPLICATION

This application claims benefit of priority from U.S. Provisional Patent Application Ser. No. 60/378,879 filed May 8, 2002, which is hereby incorporated by reference. This application is also a continuation-in-part of, and claims benefit of priority from, U.S. Nonprovisional Patent Application Ser. No. 10/310,383, filed Dec. 5, 2002, which is also a continuation-in-part of, and claims benefit of priority from U.S. Nonprovisional Patent Application Ser. No. 10/213,505, filed Aug. 6, 2002, which claims benefit of priority from U.S. Provisional Patent Application Ser. No. 60/310,077 filed Aug. 6, 2001, all of which are hereby incorporated by reference.

FIELD OF THE INVENTION

The present invention relates generally to color management systems for projection displays, and more specifically to systems and methods for incorporating a transmissive panel and/or optical isolator into a system for separating input illumination into separate color channels, superimposing spatial information on each of the separate channels, eliminating unwanted noise, and recombining the separate color channels to facilitate projection of a high-contrast, full color image.

BACKGROUND OF THE INVENTION

In conjunction with a projection display, it is desirable to employ a color management system, and it is further desirable that such color management system facilitate the production of a high contrast image while accommodating a relatively high level of illuminating flux and providing for efficient packaging. Unfortunately, currently existing color management systems are capable of achieving increased contrast at practical levels of illuminating flux only by employing highly specialized materials, resulting in unreasonable increases in cost.

A color management system typically functions by first separating input light (e.g., white light) into a plurality of color channels traversing the visible spectrum (e.g. red, green and blue), then using the separate color channels to illuminate a plurality of corresponding microdisplays (e.g., LCoS microdisplays) and recombining the color channels to produce an output light (e.g., white light). Where it is desired to project an image in conjunction with the output light beam, spatial information may be superimposed into each of the color channels by the microdisplays prior to recombination. As a result, a full color image may be projected in conjunction with the output light beam. As used herein, the terms "microdisplay," "panel," "display," "display panel," and "light valve" refer to a mechanism configured for receiving an incipient light beam, imparting spatial information in the light beam, and emitting a modified light beam comprising the incipient light beam and the spatial information. An example of such a microdisplay is model number DILA SX-070 manufactured by the JVC company of Japan.

It should be noted that a microdisplay may be configured as a substantially reflective display panel or as a substantially transmissive display panel. A substantially reflective display panel is configured to emit a modified light beam toward a direction that is substantially toward the direction from which the incipient light beam came (i.e., to retroreflect). A substantially transmissive display panel is configured to emit a modified light beam toward a direction that is substantially similar to the direction in which the incipient light beam travels (i.e., to transmit a modified light beam through the panel). For example, a reflective panel may be configured to receive an incipient light beam traveling in a first direction, to impart spatial information upon the light beam, and to emit a modified light beam toward the direction from where the incipient light beam originated (i.e., reflected 180 degrees from the direction of the incipient light beam). Alternatively a transmissive panel may be configured to receive an incipient light beam, to impart spatial information in the light beam, and to emit a modified light beam in substantially the same direction as that in which the incipient light beam travels.

Prior art color management systems have thus far not sufficiently proven to be able to produce high contrast images at low cost without compromising their ability to maintain reasonable quantities of illuminating flux or to be packaged efficiently. This is due, in part, to image noise caused by optical characteristics that are inherent in all real optical elements. This is also due to the inability of currently existing color management systems to effectively separate and remove such noise from the light beam before it is projected to a display.

For example, many prior art color management systems use solid "cube-type" polarizing beamsplitters for color separation and recombination. These polarizing beamsplitters are otherwise referred to as MacNeille prisms or cube polarizing beamsplitters. "Cube type" polarizing beamsplitters are inherently susceptible to thermal gradients that typically arise at high flux levels, often causing stress birefringence which results in depolarization of the light and a loss of contrast. As a result, where high contrast images are desired, it has been necessary to use costly high-index, low-birefringence glass. Although this solution has proven effective to reduce birefringence at low levels of flux, it is expensive and exhibits reduced effectiveness at eliminating thermally induced birefringence at high flux levels (e.g., greater than approximately 500 lumens).

For example, FIG. 1 illustrates a prior art color management system 110, commonly known as the ColorQuad™ from Colorlink, in which four cube polarizing beamsplitters and five color selective retardation elements are used to provide color separation and recombination. In accordance with this system, the input cubic polarizing beamsplitter receives an input light beam 120 and separates it into three components, a green component 121, a blue component 122, and a red component 123. The red component 123 receives spatial information from a reflective red panel 133; the blue component 122 receives spatial information from a reflective blue panel 132; and the green component 121 receives spatial information from a reflective green panel 131. Finally, the output cubic polarizing beamsplitter recombines the red component 123 and blue component 122 with green component 121 to form a full color image 140, which may be received by a projection lens or other optical elements depending on the purpose of the system.

It should be noted that at high levels of light flux, cubic polarizing beamsplitter 110 typically becomes thermally loaded and necessarily distorts physically, causing stress birefringence, which often results in depolarization of the light and a decrease in contrast. Further, in addition to receiving spatial information from the red, green and blue panels in the cubic polarizing beamsplitter 110, the red, green, and blue light components also typically receive undesirable spatial information as a result of birefringence in the materials of the optical components in the red, green, and blue light paths. This undesirable spatial information tends to further decrease the contrast of the image.

In an attempt to reduce the adverse effects of the use of cube polarizing beamsplitters, various attempts have been made to implement plate polarizing beamsplitters in place of cube configurations in color management systems. However, these attempts have often given rise to other optical aberrations associated with the plate polarizing beamsplitters, such as astigmatism. Thus, it is well understood that most if not all optical elements used in today's color management systems contribute noise to, and/or otherwise corrupt, any light beam passing through, or affected by, the optical element. It should be noted that, as used herein, the terms "noise" and/or "corrupt[ion of a] light beam" refer to optical effects associated with, and/or comprising, for example, scatter, polarization rotation (e.g., non-homogenously polarized light emitted from a polarizing beamsplitter that may comprise components having undesirably rotated polarization orientations), material birefringence, and or other undesirable characteristics associated with geometries and or coatings of optical elements, and the like.

Accordingly, many color management systems also include optical filters, such as analyzers or polarizers that are configured to attempt to eliminate most or all of such noise from the light beam so that a substantial portion of the contrast of the image might be restored. These filters may attempt to eliminate such noise, for example, by separating light according to its polarization. This is made possible by the fact that the desirable light components of the light beam may be oriented with a first polarization while the noise may be oriented differently or otherwise not substantially polarized.

Unfortunately, however, as a light beam passes through, or is affected by, an optical element, the polarization of the light tends to be disturbed. Thus, a portion of the noise often becomes indistinguishable, on the basis of polarization at least, from the light that comprises the desirable image. Accordingly, the opportunity to fully and effectively eliminate noise from the light beam on the basis of polarization diminishes as the tainted light beam passes through, or is affected by, each successive optical element. Nevertheless, in prior art systems, the additional light constituents are not removed until after the corrupted light beam has passed through, or has been affected by, additional optical elements, such as a light recombiner, a prism, and/or the like.

In addition to these and other difficulties, prior art systems are often susceptible to the effects of stray light which may undesirably reach the optical components and inadvertently be combined with, or otherwise corrupt, the desirable image imparted by the panels onto the modified light beam. For example in many prior art systems, wherein the output light beam is transmitted to a projection lens or another optical component, a portion of such light may unfortunately be reflected by the component and transmitted back (i.e., retroreflected) toward and received by other system components. The reflected light, then, may be undesirably recombined with the desirable light to produce a composite light beam containing both the desirable image and, for example, a ghost of the desirable image. Accordingly, the combined ghost-bearing image may be undesirably transmitted to the display.

In addition, prior art color management systems employing transmissive panels frequently encounter extreme thermal conditions in the optical components that are positioned downstream of the transmissive panel. This common problem is caused by the need for waste light to be rejected from the modified light beam, and may occur where the panel fails to perform the elimination of such waste light. Such situations, unfortunately, are much more common with transmissive panels than with reflective panels. More particularly, in typical color management systems, the incipient light beam which is received by a panel bears a fixed intensity or brightness. The panel, then, after receiving the incipient light beam, imparts spatial information on (i.e., modifies) the light beam by modulating the intensity of light at each of a large number of discrete locations (e.g., pixels). Typically, reflective panel systems accomplish this by reflecting (i.e., emit) only the light comprising the desirable image, by absorbing the waste light and emitting the generated heat. Transmissive panels, on the other hand, typically transmit substantially all of the incipient light they receive, but impart spatial information by spatially modifying selected properties (e.g., polarization) of the light beam. Accordingly, systems employing transmissive panels frequently must rely upon a downstream optical component to reject the waste light (and heat) based on the spatially modified properties (e.g., polarization). Accordingly, as the waste light is rejected, heat is generated. The requirement that a particular component be configured to accommodate rejection of large quantities of light often imposes difficult design constraints on those optical components.

Accordingly, it would be advantageous to have a color management system that could be used in high flux projection systems while simultaneously functioning in a wide range of thermal environments with reduced birefringence sensitivity and improved durability while producing a high-contrast image. It would further be advantageous to have a color management system that could achieve these objectives without requiring costly, high index, low birefringence glass or a particular susceptibility to optical aberrations produced by polarizing beamsplitters in plate configurations. It would further be advantageous to have a color management system that could achieve these objectives while eliminating or reducing ghosts or other undesirable images caused by stray light. It would further be advantageous to have a color management system that could achieve these objectives in transmissive panel systems while relieving the extreme temperature environment difficulties associated with such transmissive panels.

SUMMARY OF THE INVENTION

The methods and apparatus of the present invention address many of the shortcomings of the prior art. In accordance with various aspects of the present invention, improved methods and apparatus facilitate color management for projection display systems. The effective color management of the present invention is suitable for use in high flux projection systems with improved contrast, birefringence sensitivity, and durability, while significantly reducing cost. In addition, the present invention provides color management suitable for use in adverse thermal environments without requiring costly, high index, low birefringence glass.

In accordance with an exemplary embodiment of the present invention, a color management system includes two or more analyzers positioned to receive light beams as they are emitted from the panels of a color management system. The analyzers are positioned to receive the light beams directly from the image assimilators before the light has passed through another optical element such as, for example, a light combiner. The analyzers are configured for producing filtered light outputs with improved contrast relative to the incoming light beams. By positioning the analyzers to receive the light beams directly from the image assimilators, i.e., prior to passage through other optical elements, the analyzers are able to remove substantially all of the noise before the noise has become indistinguishable, on the basis of polarization, from the light that comprises the desirable image. Accordingly, this embodiment produces images having dramatically improved levels of contrast and dark state uniformity relative to prior art systems.

In accordance with another exemplary embodiment of the present invention, each analyzer may also include an optical retarder element, such as a half-wave retarder or a quarter-wave retarder. Where the filter comprises an optical retarder element, the retarder element may be configured to selectively modify the polarization of the light emerging from the image assimilator so that the emerging light is substantially linearly polarized and further so that the polarization axis for each color band is substantially the same as that of each other color band. It should be noted that such optical retarder elements may be selected to exhibit a specific optical retardance, for example, between 15 nanometers and 350 nanometers of optical retardance, depending upon the extent to which rotation is desired to match the residual retardance in the image assimilator, e.g., to substantially compensate for the optical retardance of the panel. Optionally, depending on the characteristics of the optical retarder element, the analyzer may be configured to remove light of a predetermined wavelength, or band of wavelengths, from the light output.

In an exemplary embodiment, a color management system comprises a single panel, or may comprise two or more panels, wherein each panel receives and emits a separate light component. In accordance with this embodiment, the separate light components may have originated from a light source, from which a light beam was received by one or more light separators. Each such light separator is positioned to receive a light input comprising two or more components, and each such light separator is configured for separating the components from one another and for emitting two or more light beams, each comprising one or more of the components.

In an exemplary embodiment, a color management system may further comprise a third panel for receiving and emitting a third light component. In this embodiment, an additional light separator is positioned to receive one or more of the light beams from a first light separator, and the additional light separator is configured to further separate the light emitted by the first light separator into two additional components. Each light separator may comprise a dichroic beamsplitter, a dichroic prism coupled with an optical retarder, a plate dichroic beamsplitter, and/or a polarizing beamsplitter, which may further comprise a wire grid polarizer. Each light separator may be configured for producing a red light output, a green light output, a blue light output, or a cyan light output comprising green light and blue light.

In an exemplary embodiment, a color management system may comprise one or more image assimilator, each being associated with a light component. Each such image assimilator may comprise a reflective spatial light modulator configured to modify the polarization of the incoming light beam in a predetermined manner and to superimpose spatial information on the light beam so as to produce a light beam that comprises spatial information. Each such reflective image assimilator is configured for substantially transmitting an incoming light beam to be received by a reflective display panel, to receive a modified light beam from the reflective display panel, and to emit the modified light beam to be received directly by an analyzer. In such a configuration, as the reflective panel produces a modified light beam comprising spatial information, the panel also filters and rejects waste light.

Alternatively, each image assimilator may comprise a transmissive spatial light modulator that may similarly be configured to modify the polarization of the incoming light beam in a predetermined manner and to superimpose spatial information on the light beam so as to produce a light beam that comprises spatial information. Each such transmissive image assimilator is configured for receiving an incoming light beam, superimposing spatial information on the light beam, optionally rejecting or filtering waste light to produce a modified light beam, and emitting the modified light beam to be received directly by an analyzer.

In addition to a spatial light modulator, each image assimilator may comprise a plate dichroic beamsplitter, a dichroic prism coupled with an optical retarder, and/or a polarizing beamsplitter which may further comprise a wire grid polarizer. As discussed briefly above, in a reflective panel, the panel may be configured to reject waste light. In a transmissive panel configuration, however, the panel may not be configured to filter and reject the waste light, but may be configured to modify only its polarization. Accordingly, image assimilators comprising such non-filtering transmissive panels may also comprise a waste light separator. For example, in an exemplary embodiment, the waste light separator may comprise a wire grid polarizer positioned to receive the modulated light beam emitted from the transmissive display panel and to selectively reject the undesirable waste light on the basis of polarization.

In an exemplary embodiment, a color management system also includes a light combiner positioned to receive the filtered light beams emitted from the analyzers, which receive light directly from the image assimilators. The light combiner is configured to combine the filtered light outputs to produce a single filtered light output. The light combiner may comprise a dichroic beamsplitter or an x-prism. If the light combiner is an x-prism, it may include one or more dichroic filters and may also include a polarizing beamsplitter. As discussed briefly above, in color management systems where the image assimilators comprise transmissive panels but fail to completely or effectively separate and reject waste light prior to transmission to downstream components, such as the analyzer or the light combiner, such components must be configured to accommodate increased thermal loading associated with the additional transmitted waste light. In transmissive panel systems wherein the image assimilators comprise an effective means for separating and rejecting waste light, such as a polarizing beamsplitter, downstream components, such as the analyzer or the light combiner, may be configured to accommodate decreased thermal loading.

The color management system may also include a projection lens for projecting an output light beam containing spatial information for projecting an image. In an exemplary embodiment, the color management system may include an optical isolator positioned to isolate any light that may be reflected by the projection lens or another optical component and to prevent such stray light from being received by the light combiner or another optical component of the system and being recombined with the modified light beam. Accordingly, the optical isolator may be effective in eliminating or reducing unwanted ghost images and other undesirable effects of stray light.

In accordance with an exemplary embodiment of the present invention a method for facilitating color management for a projection system is provided comprising the steps of receiving two or more input light beams having spatial information and noise directly from associated image assimilators, separating the noise from the spatial information in each of the light beams, and emitting filtered light outputs comprising the spatial information, whereby the output light beams have an improved contrast relative to the input light beams. In accordance with an exemplary embodiment of the present invention a method for facilitating color management for a projection system may comprise rejecting waste light from a modified light beam before filtering said light beam to produce a light beam having improved contrast relative to the modified light beam.

As used herein, the term "component" refers to a portion of a light transmission. For example, where a light transmission contains light of various wavelengths in the visible spectrum (e.g., blue, red, and green), the light transmission may be separated into a plurality of components, each corresponding to a range of wavelengths (i.e., color bands), such as blue, red, or green, in the visible spectrum. As a further example, a light transmission may comprise polarized light oriented in one or more planes.

Accordingly, the use of closely-coupled analyzers positioned to receive light beams directly from associated image assimilators enables the color management system to effectively eliminate a substantial portion of noise imparted on the light beam by each of the image assimilators and to produce output beams having superior contrast relative to the prior art. Moreover, the present invention may employ both polarization dependent elements and dichroic elements to split an input light into a plurality of color bands upon which spatial information may be superimposed by a corresponding plurality of microdisplays, the modified color bands being recombined to produce a high-contrast, full color projected image.

BRIEF DESCRIPTION OF THE DRAWINGS

The above-mentioned objects and features of the present invention can be more clearly understood from the following detailed description considered in conjunction with the following drawings, in which like numerals represent like elements and in which.

DETAILED DESCRIPTION

The present invention may be described herein in terms of various functional elements and/or various processing steps. It should be appreciated that such functional elements may be realized by any number of software, hardware, electrical, optical and/or structural elements configured to perform the specified functions. For example, the present invention may employ various optical and/or digital electrical elements, whose values may be suitably configured for various intended purposes. In addition, the present invention may be practiced in any optical application. However, for purposes of illustration only, exemplary embodiments of the present invention will be described herein in connection with projection displays. Further, it should be noted that while various elements may be suitably coupled or connected to other elements within exemplary optical systems, such connections and couplings can be realized by direct connection between elements, or by connection through other elements and devices located thereinbetween.

As discussed above, prior art color management systems suffer from shortcomings such as limitation in light intensity, high cost, poor image contrast, excessive birefringence sensitivity, and lack of durability. Prior art attempts to overcome these shortcomings have involved the use of costly high-index, low-birefringence glass. Yet, despite the use of these expensive materials, poor image contrast, and thermally induced birefringence remain problems at light intensity levels greater than approximately 500 lumens.

In accordance with various aspects of the present invention, an improved color management system is provided that improves image contrast and facilitates color management suitable for use in adverse thermal environments without requiring costly, high index, low birefringence glass. The invention includes any suitable system or method for closely coupling analyzers to image assimilators. The invention also includes any suitable system or method for the analyzers to receive light beams directly from the image assimilators, and in certain embodiments, analyzers receiving two or more light beams directly from image assimilators. In accordance with an exemplary embodiment of the present invention, input illumination light is split into a plurality of different color bands and then recombined after superimposition of spatial information by a corresponding plurality of microdisplays and reduction of noise as provided by corresponding filters, thereby producing a substantially full-color, high-contrast image. As a result, effective color management of the present invention is suitable for use in high lumen projection systems with reduced cost, improved contrast, reduced birefringence sensitivity, improved dark state uniformity, and improved durability. In addition, the present invention provides color management suitable for use in adverse thermal environments without requiring costly, high index, low birefringence glass.

Figure 1:
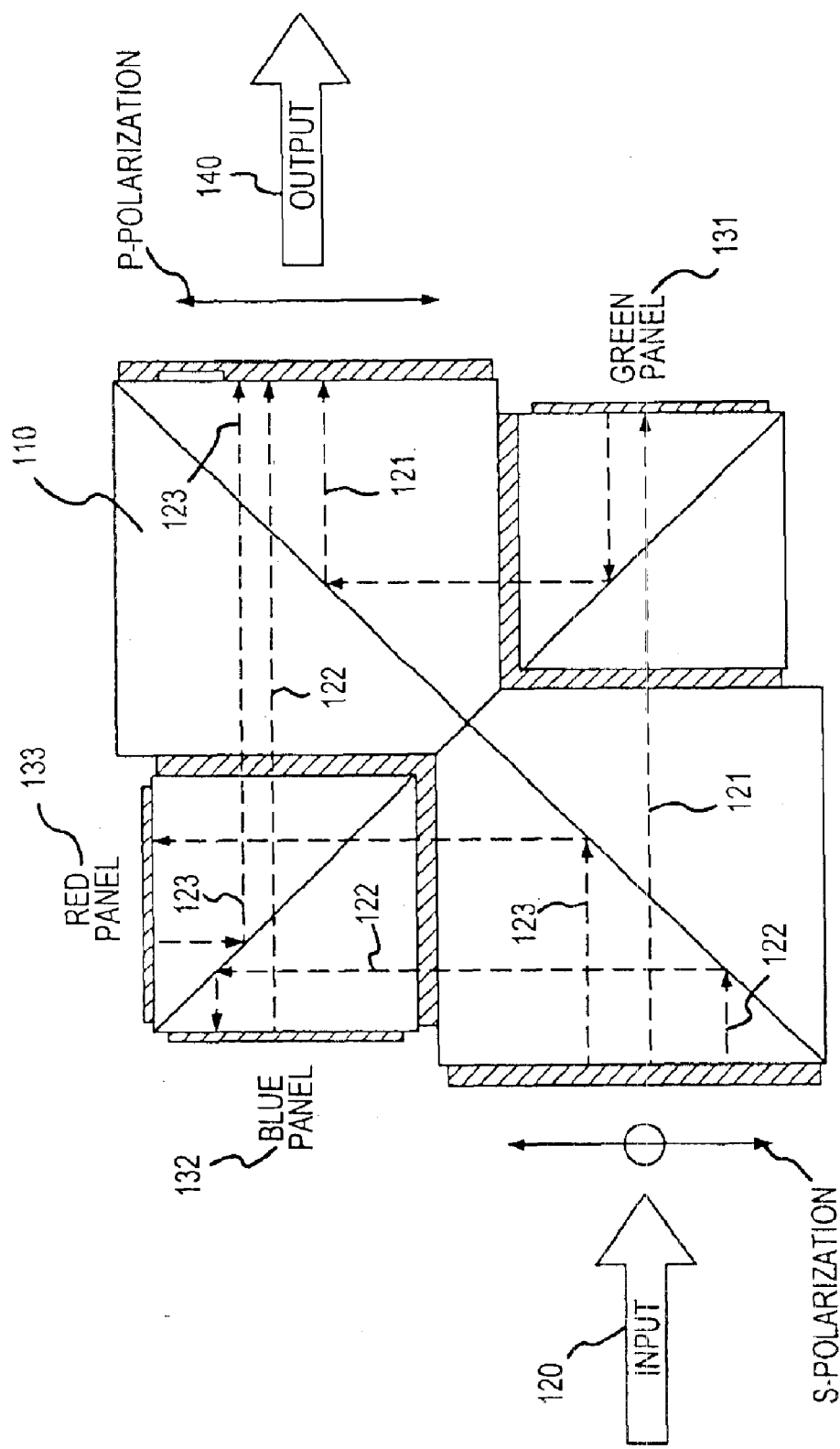
FIG. 1 illustrates a prior art color management system.
Figure 2:
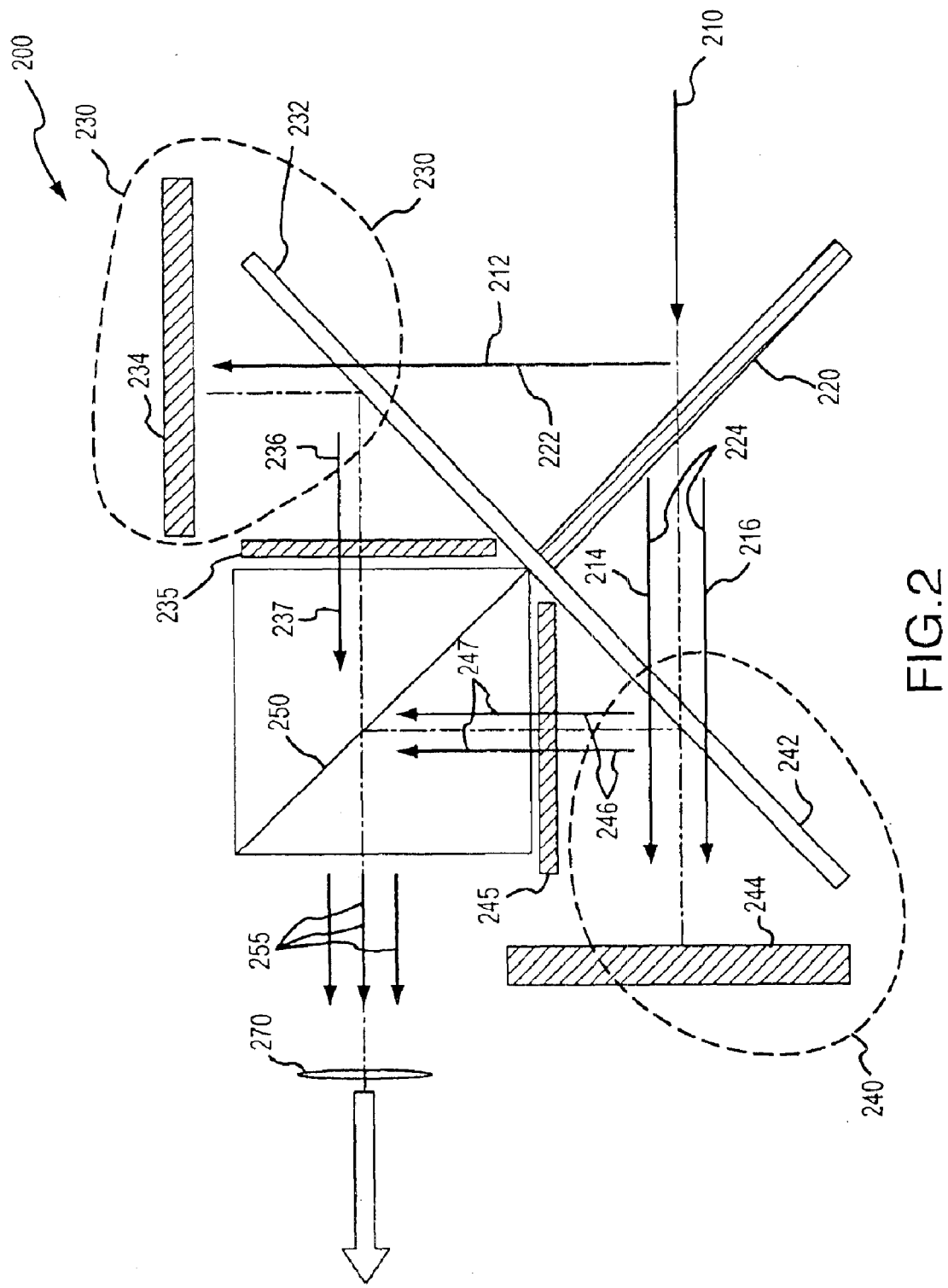
FIG. 2 illustrates a color management system in accordance with an exemplary embodiment of the present invention.

In one embodiment, with reference to FIG. 2, an exemplary color management system 200 includes a light separator 220, a first image assimilator 230, a second image assimilator 240, a first analyzer 235, a second analyzer 245, and a light combiner 250. In accordance with this embodiment, light separator 220 receives a light beam 210 from a source, separates the light beam 210 into two or more components 212, 214, 216, and emits two or more light beams 222, 224, each comprising one or more of the components. For example, as shown in FIG. 2, light separator 220 is positioned to receive a light input 210 comprising a first component and a second component. Light separator 220 is configured for separating said first component from said second component and emitting a first light beam 222 comprising said first component 212 and a second light beam 224 comprising said second component 214 and a third component 216. It should be noted that light separator 220 may comprise a polarizing beamsplitter configured for separating light oriented in a first plane from light oriented in a second plane and emitting a first light beam 222 comprising light oriented in the first plane 212 and a second light beam 224 comprising light oriented in the second plane

214. It should be noted that light separator 220 may comprise a dichroic mirror, a dichroic beamsplitter, a dichroic prism coupled with an optical retarder, a plate dichroic beamsplitter, or a polarizing beamsplitter, which may further comprise a wire grid polarizer. Light separator 220 may be configured for producing a red light output, a green light output, a blue light output, and/or a cyan light output comprising green light and blue light. As shown in FIG. 2, light separator 220 is a dichroic plate beamsplitter configured to receive a modulated input light beam 210 and to emit two output light beams 222, 224. In one embodiment, first output light beam 222 comprises a red component 212 and second output light beam 224 comprises a blue component 214 and a green component 216.

It should be noted that light separator 220 may also be configured for producing light where color images are generated by temporally modulating the color of the light into separate spectral bands, which can consist of red, green, and blue, or any other combination that could be recombined to produce a desired output, such as a white light output. As shown in FIG. 2, light separator 220 is a polarizing plate beamsplitter configured to receive a modulated input light beam 210 and to emit two output light beams 222, 224. First output light beam 222 comprises a polarized light component 212. Second output light beam 224 comprises a polarized light component 214 which is substantially orthogonal to the polarized light component 212 of the first light beam 222.

It should be noted that, in general, a polarizing beam splitter 220 is a device configured to separate an incipient beam of light 210 into two emergent linear polarized beams of light 222, 224. As such, polarizing beamsplitter 220 may comprise a dichroic mirror having a coating configured to separate light 210 into components of different colors 212, 214. For example a typical coating may be a thin film dielectric coating. In another embodiment, polarizing beamsplitter 220 may be a dielectric beamsplitter having a coating configured to separate light into different components 212, 214 based upon, for example, color or polarization.

In accordance with the invention, polarizing beamsplitter 220 is configured for separating polarized light oriented in a first plane from polarized light oriented in a second plane. In an exemplary embodiment, polarizing beamsplitter 220 may be configured to emit in a first direction the polarized light oriented in the first plane 212 and to emit in a second direction the polarized light oriented in a second plane 214, wherein the second direction is substantially orthogonal to the first direction. In another exemplary embodiment, polarizing beamsplitter 220 may be configured, as shown in FIG. 2, to substantially transmit the polarized light oriented in the second plane 214 and to substantially reflect the polarized light oriented in the first plane 212.

In another embodiment, polarizing beamsplitter 220 may be configured to substantially reflect the polarized light oriented in the second plane and to substantially transmit the polarized light oriented in the first plane. In accordance with this embodiment, a plurality of fold mirrors may be employed to direct the various light beams between the elements of the color management system. As used herein, a fold mirror refers to any reflective surface capable of reflecting light. For example, a fold mirror may be an aluminized mirror or an enhanced silver mirror, such as the Siflex mirror produced by Unaxis company of Liechtenstein. Polarizing beamsplitter 220 may comprise a pair of polarizing beamsplitters having their active surfaces facing substantially away from one another, or a single polarizing beamsplitter element with active surfaces on both sides.

With further reference to FIG. 2, first image assimilator 230, which comprises first polarizing beamsplitter 232 and first microdisplay 234, is positioned to receive first output light beam 222. A second image assimilator 240, which comprises second polarizing beamsplitter 242 and second microdisplay 244, is positioned to receive second output light beam 224. Each such image assimilator 230, 240 may comprise a reflective spatial light modulator 234, 244 configured to modify the polarization of the incoming light beam in a predetermined manner and to superimpose spatial information on the light beam so as to produce a light beam that comprises spatial information. Each such image assimilator 230, 240 is configured for substantially transmitting an incoming light beam to be received by a display panel 234, 244, for receiving a modified light beam from the display panel, and for emitting the modified light beam 236, 246 to be received directly by an analyzer 235, 245. Each image assimilator 230, 240 may comprise a plate dichroic beamsplitter, a dichroic prism coupled with or without an optical retarder, or a polarizing beamsplitter which may further comprise a wire grid polarizer.

In accordance with this exemplary embodiment, first image assimilator 230 receives a first output light beam 222, rotates its polarization orientation, imparts first spatial information on it, and emits a first modified light beam 236 comprising first spatial information and noise. Second image assimilator 240 receives second output light beam 224, rotates its polarization orientation, imparts second spatial information on it, and emits a second modified light beam 246 comprising second spatial information and noise. In accordance with this embodiment, first and second spatial information comprise polarized light.

In an exemplary embodiment, image assimilator 230, 240 may comprise a dichroic prism. In an alternative embodiment, image assimilator 230, 240 may be a substantially equal path length prism. In another exemplary embodiment, image assimilator 230, 240 may comprise a polarizing filter for producing a differentiated light output comprising the second component 214 and the third component 216, where the orientation of the second component 214 is rotated to be orthogonal to the orientation of the third component 216. In accordance with this alternative embodiment, image assimilator 230, 240 further comprises a second polarizing beamsplitter positioned to receive from the polarizing filter the differentiated light output. This second polarizing beamsplitter is configured for separating the second component 214 from the third component 216 before substantially transmitting the second component to be received by the second microdisplay and before substantially transmitting the third component to be received by a third microdisplay.

Accordingly, in an exemplary embodiment, the contrast of the image may be enhanced by such an analyzer 235, 245 positioned to receive the modified light outputs from image assimilator 230, 240 and to further modify the light to produce polarized light oriented in a single plane (i.e., substantially linearly polarized light) which may be accomplished by rotating the polarization axis of one or more of the light beams. In yet another exemplary embodiment, the analyzer 235, 245 may be configured for removing light of a predetermined wavelength from the light beam, depending on the characteristics of the filters (i.e., the color selective retardation elements).

As used herein, the terms "filter" and "analyzer" refer to optical filters, and combinations of optical elements, configured to discriminate (i.e., block, permit to pass, and/or alter the polarization properties of light flux based on physical characteristics of the light, such as wavelength, orientation, polarization, flash and/or field rate) and may be constructed using any technique known in the art such as, for example, embedding an optically active material such as a spectrally sensitive optical retardation film in or on an otherwise transparent substrate or placing a plurality of very thin wires in parallel orientation to one another leaving thin gaps through which light may pass to produce polarized light. Examples of filters configured for discriminating light based upon its physical characteristics include dichroic plates manufactured by OCLI of Santa Rosa, Calif. and Unaxis of Liechtenstein; ColorSelect filters manufactured by ColorLink of Boulder, Colo.; absorptive sheet polarizers manufactured by Polaroid, and ProFlux polarizers and polarizing beamsplitters manufactured by Moxtek of Orem Utah.

With further reference to FIG. 2, in an exemplary embodiment, first analyzer 235 is positioned to receive first modified light output 236 directly from first image assimilator 230 and is configured to separate first spatial information from noise based on polarization. In accordance with this embodiment, first analyzer 235 is configured to substantially transmit first spatial information and to prevent or minimize transmission of noise, which comprises substantially non-polarized light or polarized light that is not oriented in the same manner as the desired spatial information. It should be noted that first analyzer 235 may comprise a polarizer and may be configured to absorb light of a predetermined polarization (e.g., an absorptive polarizer such as a stretched polymer polarizer), may be configured to reflect light of a predetermined polarization (e.g., a reflective polarizer such as a dichroic or wire grid polarizer), or may be configured to absorb light of a first polarization and to reflect light of a distinct second polarization (e.g., a hybrid polarizer). It should also be noted that first analyzer 235 may also comprise a color filter such as a dichroic filter or a bulk absorptive filter.

Similarly, second analyzer 245 is positioned to receive second modified light output 246 directly from second image assimilator 240 and is configured to substantially separate second spatial information from noise based on polarization. As with first analyzer 235, it should also be noted that second analyzer 245 may comprise a polarizer and may be configured to absorb light of a predetermined polarization (e.g., an absorptive polarizer such as a stretched polymer polarizer), may be configured to reflect light of a predetermined polarization (e.g., a reflective polarizer such as a dichroic or wire grid polarizer), or may be configured to absorb light of a first polarization and to reflect light of a distinct second polarization (e.g., a hybrid polarizer). It should also be noted that second analyzer 245 may also comprise a color filter such as a dichroic filter or a bulk absorptive filter.

Also in accordance with this embodiment, second analyzer 245 is configured to substantially transmit second spatial information and to prevent or minimize transmission of noise, which, again, comprises substantially non-polarized light or polarized light that is not oriented in the same manner as the desired spatial information. Because first analyzer 235 and second analyzer 245 are positioned to receive first modified light output 236 and second modified light output 246 directly from first and second image assimilators 230, 240, prior to modification by any other optical elements, first and second analyzers 235, 245 are capable of eliminating or reducing or minimizing substantially all of the noise imparted by image assimilator 230, 240.

It should be noted that the analyzers 235, 245 are positioned to receive the light beams directly from the image assimilators 230, 240 before the light has passed through another optical element such as a light combiner 250. It should also be noted that analyzers 235, 245 are generally configured for producing filtered light outputs with improved contrast relative to the incoming light beams. By positioning the analyzers 235, 245 to receive the light beams directly from the image assimilators 230, 240, i.e., prior to passage through or modification by optical elements other than those comprised by the image assimilators, the analyzers 235, 245 are able to remove substantially all of the noise before the noise becomes indistinguishable, on the basis of polarization, from the light that comprises the desirable image. Accordingly, this embodiment produces images having dramatically improved levels of contrast relative to prior art systems.

In accordance with another exemplary embodiment of the present invention, each analyzer 235, 245 may also include an optical retarder element, such as a half-wave retarder or a quarter-wave retarder. Where the filter comprises an optical retarder element, the retarder element may be configured to selectively modify the polarization of the light emerging from the image assimilator so that the emerging light is substantially linearly polarized and further so that the polarization axis for each color band is substantially the same as that of each other color band. As mentioned above, it should be noted that such filters may be selected to exhibit a specific optical retardence, for example, between 15 nanometers and 350 nanometers of optical retardence, depending upon the extent to which rotation is desired to match the residual retardence in the image assimilator, e.g., to substantially compensate for the optical retardence of the panel. Optionally, depending on the characteristics of the optical retarder element, the analyzer 235, 245 may remove light of a predetermined wavelength, or band of wavelengths, from the light beam 236, 246.

In an exemplary embodiment, a color management system also includes a light combiner 250 positioned to receive the filtered light beams 237, 247 emitted from the analyzers 235, 245. The light combiner 250 is configured to substantially combine the filtered light beams 237, 247 to produce a single filtered light output 255. For example, as shown in FIG. 2, in an exemplary embodiment, the invention also includes a light combiner 250 that forms a comprehensive light output 255 from the individual light outputs 237, 247. In an exemplary embodiment, the light combiner 250 comprises a polarizing beamsplitter, which may be the same element, and serve the substantially same function, as the light separator 220. The light combiner 250 may comprise a dichroic beamsplitter or an x-prism. Where the light combiner 250 is an x-prism, it may include one or more dichroic filters and may also include a polarizing beamsplitter. It should be noted that where light combiner 250 comprises an x-prism, the x-prism may be optimized for operation under any one of a variety of polarization orientations. For example, an x-prism may be optimized to operate under s-s-s polarization, p-p-p polarization, s-p-s polarization, or p-s-p polarization. Further, where x-prism is optimized under p-s-p polarization, it may be configured to isolate and/or recombine light transmissions that comprise substantially red, green and blue components.

It should be noted that an x-prism is an optical element having two planes that lie substantially orthogonal to one another. In an exemplary x-prism, a first plane is a dichroic filter configured to substantially transmit light having a first wavelength and to substantially reflect light having a second wavelength. In such an exemplary x-prism, a second plane, lying substantially orthogonal to the first plane, has a dichroic filter configured to substantially reflect light having the first wavelength and to substantially transmit light having the second wavelength. In another exemplary x-prism, a first plane is a dichroic filter configured to substantially transmit light having a first wavelength and to substantially reflect light having a second wavelength. In this exemplary x-prism, a second plane, lying substantially orthogonal to the first plane, has a polarizing beamsplitter configured to substantially reflect light oriented with a first polarization and to substantially transmit light oriented with a second polarization In an exemplary embodiment, such as the embodiment illustrated in FIG. 2, wherein the first output light beam 222 is directed substantially perpendicular to the second output light beam 224, first polarizing beamsplitter 232 and second polarizing beamsplitter 242 may comprise the same polarizing beamsplitter oriented so as to receive both the first output light beam 222 and the second output light beam 224 at a substantially 45 degree angle from the surface of the polarizing beamsplitter 232, 242. In accordance with this embodiment, polarizing beamsplitter 232, 242 is configured to substantially transmit first output light beam 222 to be received by first microdisplay 234 and to substantially transmit second output light beam 224 to be received by second microdisplay 244. Polarizing beamsplitter 232, 242 is also positioned to receive modified first and second light beams 236, 246 at a substantially 45 degree angle. Because the polarization of the modified light beams 236, 246 are rotated from the orientation of light beams 222, 224, however, polarizing beamsplitter 232, 242 is configured to substantially reflect the modified light beams 236, 246. Therefore, in accordance with this embodiment, both of the modified light beams 236, 246 may be directed directly toward light combiner 250. The ability to use a single polarizing beamsplitter 232, 242 and to direct the modified light beams 236, 246 directly toward a light combiner 250, without the use of other elements to redirect the light beams significantly reduces cost, complexity, and size relative to other color management systems. Finally, the color management system may include a projection lens 270 for projecting an output light beam containing spatial information for projecting an image.

Figure 4:
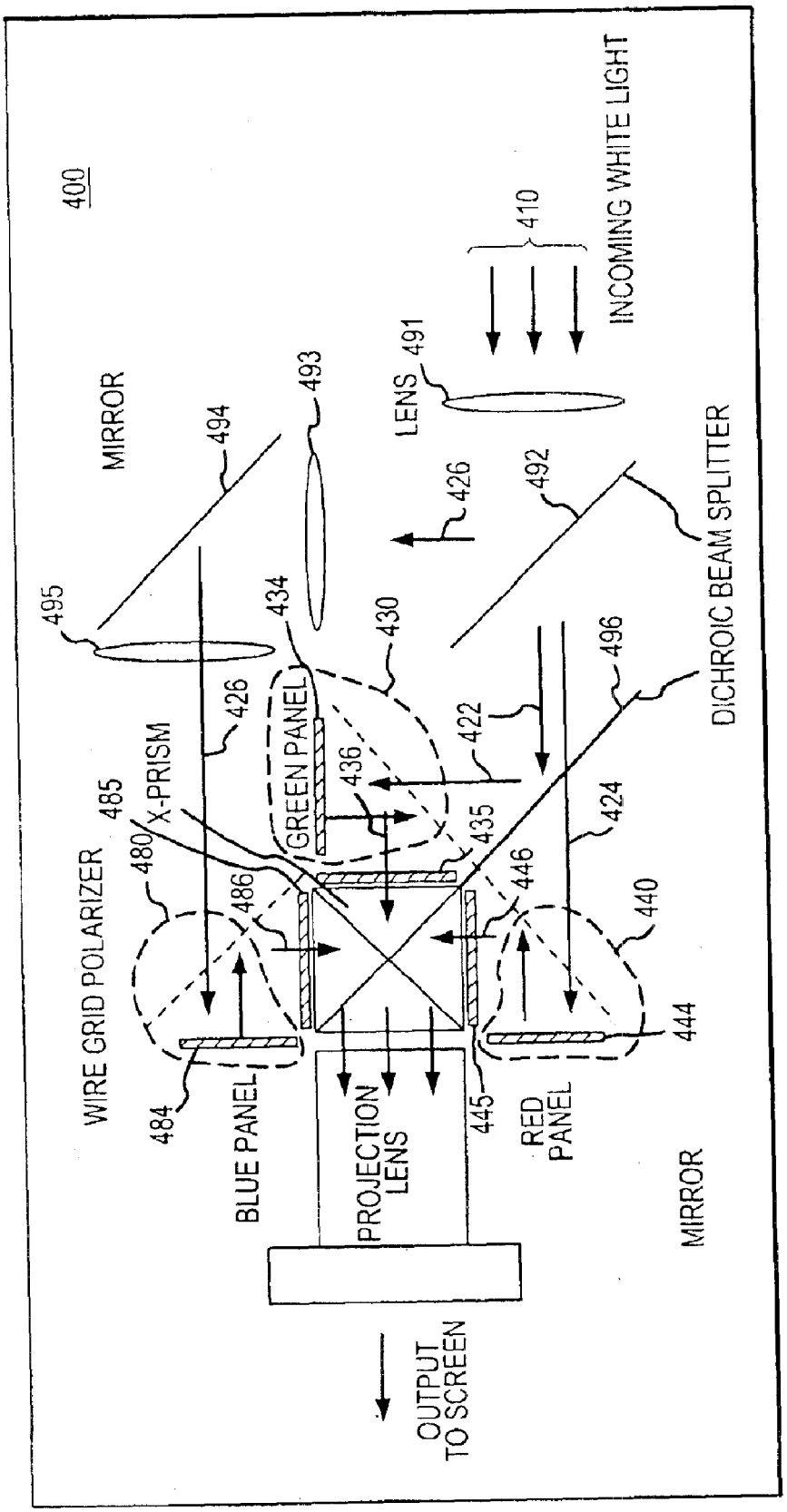
FIG. 4 illustrates a color management system in accordance with an exemplary embodiment of the present invention.

In an exemplary embodiment, as shown in FIG. 4, color management system 400 may comprise a third image assimilator 480 in addition to first image assimilator 430 and second image assimilator 440. In accordance with this embodiment, first image assimilator 430, which comprises green spatial light modulator 434, is positioned to receive first light beam 422. Second image assimilator 440, which comprises red microdisplay 444, is positioned to receive second light beam 424. Third image assimilator 480, which comprises blue panel 484, is positioned to receive third light beam 426. Each image assimilator 430, 440, and 480 is configured to modify the polarization of the incoming light beam in a predetermined manner and to superimpose spatial information on the light beam so as to produce a light beam that comprises spatial information. Each such image assimilator 430, 440, and 480 is configured for substantially transmitting an incoming light beam to be received by a display panel 434, 444, and 484 for receiving a modified light beam from the display panel, and for emitting the modified light beam 436, 446, and 486 to be received directly by an analyzer 435, 445, 485.

In accordance with this exemplary embodiment, first image assimilator 430 receives a first light beam 422, rotates its polarization orientation, imparts first spatial information on it, and emits a first modified light beam 436 comprising first spatial information and noise. In addition, first image assimilator may comprise means for eliminating or reducing waste light, and associated heat, as light is removed from first light beam 422 to create first modified light beam 436. Second image assimilator 440 receives second light beam 424, rotates its polarization orientation, imparts second spatial information on it, and emits a second modified light beam 446 comprising second spatial information and noise. In addition, second image assimilator may comprise means for eliminating or reducing waste light, and associated heat, as light is removed from second light beam 424 to create second modified light beam 446. Third image assimilator 480 receives third light beam 484, rotates its polarization orientation, imparts third spatial information on it, and emits a third modified light beam 486 comprising third spatial information and noise. In addition, third image assimilator may comprise means for eliminating or reducing waste light, and associated heat, as light is removed from third light beam 484 to create third modified light beam 486. In accordance with this embodiment, first, second, and third spatial information comprise polarized light. It should be noted that the above described means for eliminating or reducing waste light and associated heat may be inherent in a panel (e.g., a reflective/absorptive panel) or may comprise a separate optical element such as a polarizing beamsplitter configured for separating and eliminating or reducing waste light.

Accordingly, in this exemplary embodiment, the contrast of the image may be enhanced by such analyzers 435, 445, and 485 positioned to receive the modified light outputs from image assimilators 430, 440, and 480 and to further modify the light to produce polarized light oriented in a single plane (i.e., substantially linearly polarized light) which may be accomplished by rotating the polarization axis of one or more of the light beams. Also, as mentioned in connection with the description of another exemplary embodiment, analyzers 435, 445, and 485 may be configured for removing light of a predetermined wavelength from the light beam, depending on the characteristics of the filters (i.e., the color selective retardation elements).

As one skilled in the art will appreciate, a variety of configurations may be constructed to effectively separate an input light beam comprising white light into a plurality of component light beams, upon which spatial information may be imparted, and from which noise may be effectively separated and removed by passing such modified component light beams from the image assimilators to be directly received by a plurality of corresponding analyzers. Such configurations may comprise a combination of polarizing beamsplitters, mirrors, and/or field lenses arranged to separate input light into component light beams and to direct those component light beams so that they may be received by associated image assimilators. For example, as shown in FIG. 4, in an exemplary embodiment, an input light beam 410 may be received by a first lens 491, which transmits a light beam to be received by dichroic beamsplitter 492. Dichroic beamsplitter transmits first component 422 and second component 424, but reflects third component 426. Lens 493 is positioned to receive reflected component 426 and to transmit component 426 to be received by mirror 494. Mirror 494 is positioned to receive component 426 from lens 493 and to reflect component 426 to be received by lens 495. Lens 495 is positioned to receive component 426 from mirror 494 and to transmit component 426 to be received by image assimilator 480. With further reference to FIG. 4, dichroic beamsplitter 496 is positioned to receive components 422 and 424 from dichroic beamsplitter 492 and is configured to reflect component 422 to be received by image assimilator 430 while transmitting component 424 to be received by image assimilator 440. Finally, it should be noted that light emitted from image assimilators 430, 440 may be recombined using a variety of mechanisms known in the art, e.g., one or more Philips prism, modified Philips prism, plumbicon prism, x-prism, three-channel prism, recombining prism, and the like. For example, as shown in FIG. 4, light emitted from image assimilators 430, 440 may be recombined using an x-prism.

Figure 5:
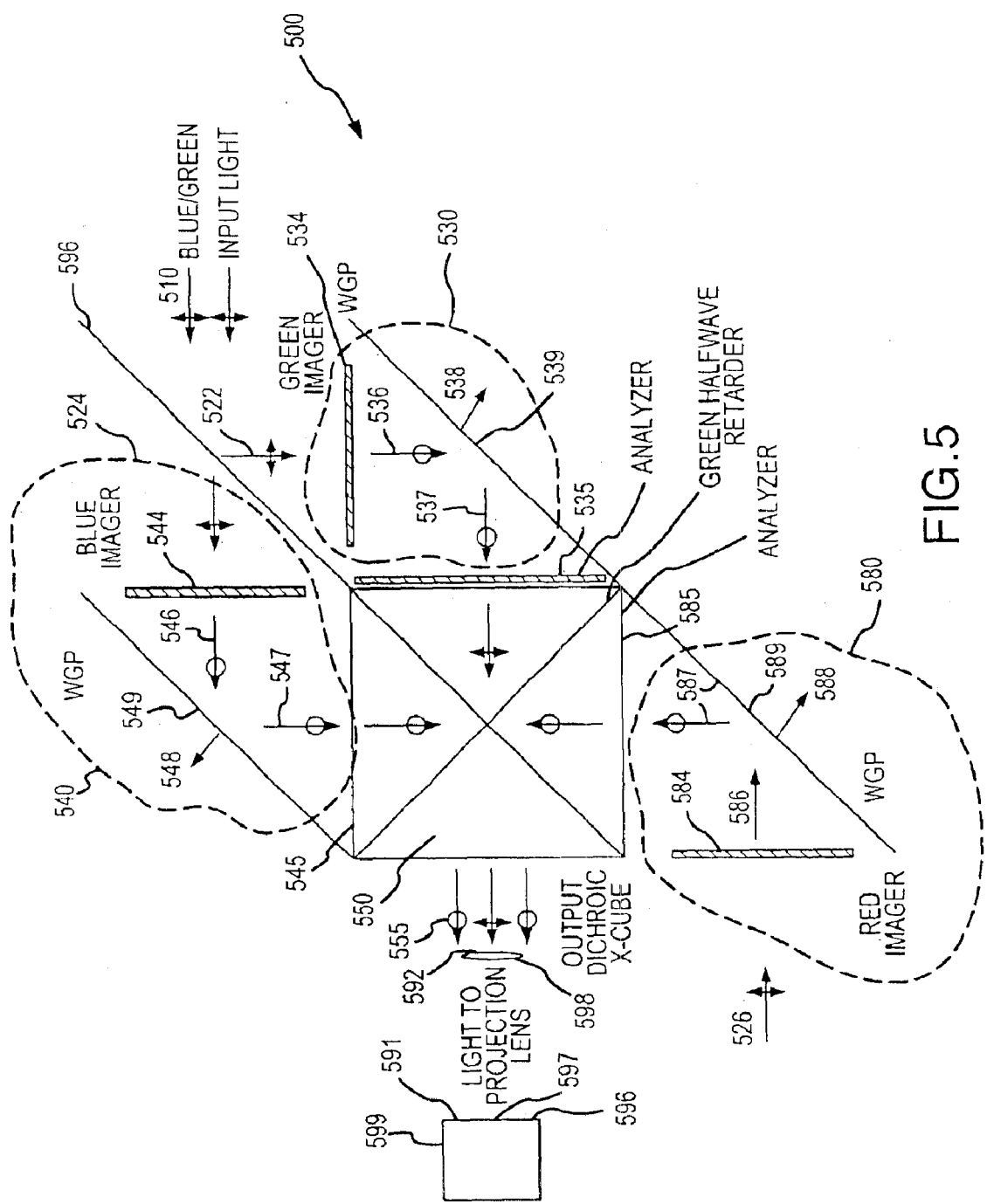
FIG. 5 illustrates a color management system in accordance with an exemplary embodiment of the present invention.

The invention may also include any suitable system or method for isolating stray light that may otherwise be received by an optical component of the system and combined with the desirable light beam being transmitted by the system. In addition, where the system includes micro display comprising a transmissive panel, the invention includes any suitable system or method for rejecting waste light prior to emission of a modified light beam from the image assimilator. For example, in an exemplary embodiment as shown in FIG. 5, color management system 500 includes a light separator 596, a first image assimilator 530, a second image assimilator 540, and a third image assimilator 580. In addition, color management system 500 further includes a first analyzer 535 positioned to receive a modified light beam directly from first image assimilator 530, a second analyzer 545 positioned to receive a modified light beam directly from second image assimilator 540, a third analyzer 585 positioned to receive a modified light beam directly from third image assimilator 580, and light combiner 550 positioned to receive a filtered light beams from analyzers 535, 545, 585. In accordance with this embodiment, light separator 596 receives a light beam 510 from a source, separates the light beam 510 into two or more components, and emits two or more light beams 522, 524, each comprising one or more components. Separately a third light beam 526 may be produced from a second source or alternatively may further be separated from either of light beams 510, 522, or 524.

With further reference to FIG. 5, first image assimilator 530, which comprises first transmissive panel 534, is positioned to receive first output light beam 522. A second image assimilator 540, which comprises second transmissive panel 544, is positioned to receive second light beam 524. Further, a third image assimilator 580, which comprises third transmissive panel 584, is positioned to receive third output light beam 526. Transmissive panel is any hardware and/or software suitably configured to transmit substantially all of the incipient light it receives, but impart spatial information by spatially modifying selected properties (e.g., polarization) of the light beam. Each such image assimilator 530, 540, 580 may comprise a transmissive spatial light modulator 534, 544, 584 configured to modify the polarization of the incoming light beam in a predetermined manner and to superimpose spatial information on the light beam so as to produce a light beam that comprises spatial information. It should be noted that such spatial information may comprise selectively modulated polarization of individual regions (i.e., pixels) selected for their spatial orientation on a display. Each such image assimilator 530, 540, 580 is configured for receiving an incoming light beam to be received by transmissive display panel 534, 544, 584, respectively, and for emitting modified light beam 536, 546, 586. In accordance with this exemplary embodiment, image assimilators 530, 540, 580 may further comprise waste light separators 539, 549, 589, respectively. Separators 539, 549, 589 are positioned to receive modified light beams 536, 546, 586, respectively, to reflect useful light beams 537, 547, 587, which are to be received by analyzers 535, 545, 585. In addition, separators 539, 549, 589 are configured to separate waste light components 538, 548, 588 from modified light beams 536, 546, 586, respectively, and to reject such waste light. In an exemplary embodiment waste light separators 539, 549, 589 may comprise a wire grid polarizer or any other such light separator configured for separating useful light from waste light on the basis of optical properties which are modulated by the individual spatially distinct elements (i.e., pixels) of the transmissive panels 534, 544, 584. As a result, because the waste light has been effectively separated and eliminated thermal loading imposed upon analyzers 535, 545, 585 and/or image or light recombiner 550 may be significantly reduced.

In an exemplary embodiment, color management system 500 may also be configured to emit output light beam 555 to be received by a projection lens or another optical element 599. In an exemplary embodiment, optical isolator 598 may be positioned to receive output light beam 555 prior to receipt of light 555 by projection lens or another optical element 599. Optical isolator may be any hardware and/or software configured to rotate the polarization axis of the light. In accordance with this embodiment, stray light 597 which may be reflected by optical element 599 back toward system 500 and/or combiner 550 (i.e., retroreflected) and which might otherwise be received by image recombiner 550 and therefore recombined with output light 555, thereby producing a ghost image. In this embodiment, optical isolator 598 is configured to rotate the polarization axis of the light that it transmits by approximately 45 degrees. As a result, the polarization axis of output light beam 555 will be rotated 45 degrees as it passes through optical isolator 598 producing rotated output light beam 556. As rotated output light beam 556 is received by projection lens 599, and as stray light beam 591 is reflected toward optical isolator 598, with the same polarization orientation as rotated output light beam 556. After stray light beam 591 is received by optical isolator 598, however, and its polarization is rotated another 45 degrees, stray light beam 592 will have a polarization orientation that is rotated substantially 90 degrees from that of output light beam 555. As a result, the polarization orientation of the retroreflected light will have been rotated 90 degrees and may therefore be separate by analyzers 535, 545, 585 or another suitably configured and positioned optical component. Accordingly, the ghost image reflected by the downstream component will have been removed or otherwise rendered substantially or fully incapable of affecting the production of the desired image. It should be noted that optical isolator 598 may comprise a quarter wave retarder configured to rotate the polarization axis of an incipient light beam by approximately 45 degrees.

Figure 3:
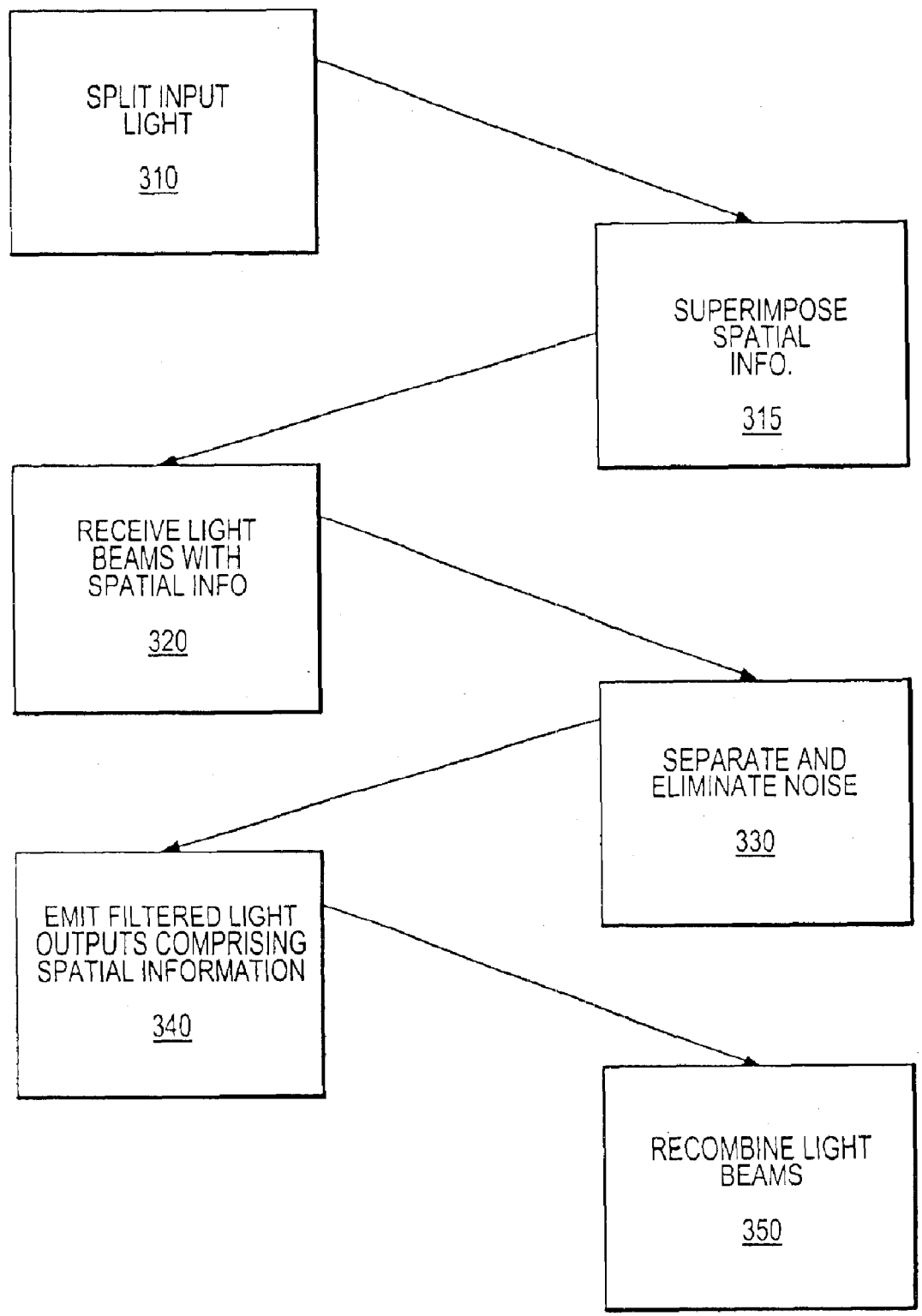
FIG. 3 is a flow chart illustrating an exemplary method in accordance with the present invention.

With reference to FIG. 3, in accordance with an exemplary embodiment of the present invention, a method for providing color management for a projection system is provided comprising the steps of receiving two or more input light beams having spatial information and noise directly from associated image assimilators (step 320), separating the noise from the spatial information in each of the light beams (step 330), and emitting filtered light outputs comprising the spatial information (step 340), whereby the output light beams have an improved contrast relative to the input light beams.

Accordingly, the use of closely-coupled analyzers positioned to receive light beams directly from associated image assimilators enables the color management system to effectively eliminate a substantial portion of noise imparted on the light beam by each of the image assimilators and to produce output beams having superior contrast relative to the prior art. Moreover, it should be noted that the present invention may employ both polarization dependent elements and dichroic elements to split an input light into a plurality of color bands upon which spatial information may be superimposed by a corresponding plurality of microdisplays, the modified color bands being recombined to produce a high-contrast, full color projected image. One skilled in the art will appreciate that the color management system of the present invention may be adapted for use in multiple panel systems, such as three panel systems as well as the two panel systems primarily described herein.

Accordingly, the present invention utilizes both polarization dependent elements and dichroic elements to split (step 310) an input light into a plurality of color bands upon which spatial information may be superimposed (step 315) by a corresponding plurality of microdisplays, the modified color bands being filtered to remove noise from the spatial information (step 330) and thereby improve contrast, the high contrast light beams being thereafter recombined (step 350) to produce a full color projected image.

In an exemplary embodiment, after the step of superimposing spatial information (step 315), and before the step of removing noise from the spatial information (step 330), it may be desirable to perform the step of modifying the geometry of the beam (step 328) emitted from the reflective panel so as to create converging conical light beam (e.g., rather than a more common telecentric light beam). In accordance with embodiments employing or otherwise facilitating this step, the light beam may be received by a downstream component (e.g., an analyzer) having a reduced cross-sectional area.

The present invention has been described above with reference to various exemplary embodiments. However, those skilled in the art will recognize that changes and modifications may be made to the exemplary embodiments without departing from the scope of the present invention. For example, the various elements may be implemented in alternate ways, such as, for example, by providing other optical configurations or arrangements. These alternatives can be suitably selected depending upon the particular application or in consideration of any number of factors associated with the operation of the system. Moreover, these and other changes or modifications are intended to be included within the scope of the present invention, as expressed in the following claims.

What is claimed is:

1. A color management system comprising a first image assimilator and a first analyzer;
    said first image assimilator comprising a transmissive panel configured for producing a first light beam comprising a first light image, waste light, and spatial information configured for distinguishing said first light image from said waste light;
    said first image assimilator further comprising a separator configured for separating substantially all of said waste light from said first light image based at least in part on said spatial information, whereby a modified first light beam is produced comprising said first light image;
    said first analyzer positioned to receive, from said first image assimilator, said modified first light beam; and
    said first analyzer configured for producing a first filtered light beam comprising said first light image and having an improved contrast relative to said modified first light beam.

2. The color management system of claim 1, wherein said waste light comprises polarized light.

3. The color management system of claim 1, wherein said first light image comprises polarized light.

4. The color management system of claim 1, wherein said separator comprises a polarizing beamsplitter positioned to receive said first light beam.

5. The color management system of claim 4, wherein said polarizing beamsplitter comprises a wire grid polarizer.

6. The color management system of claim 1, further comprising an optical isolator positioned to receive said first filtered light beam wherein said optical isolator is configured for substantially eliminating retroreflections of said first filtered light beam.

7. The color management system of claim 6, wherein said first filtered light beam has an initial polarization axis;
    said optical isolator configured for emitting a substantially circularly polarized light beam comprising said first light image;
    said optical isolator further positioned to receive a reflected light beam comprising a reflection of said substantially circularly polarized light beam;
    said optical isolator configured for emitting an orthogonally-rotated light beam having a polarization axis rotated approximately 90 degrees relative to said initial polarization axis.

8. The color management system of claim 6, wherein said optical isolator comprises an optical retarder.

9. The color management system of claim 7, further comprising a polarizing beamsplitter positioned adjacent to said first analyzer which is positioned to receive said orthogonally-rotated light beam.

10. The color management system of claim 9, wherein said polarizing beamsplitter comprises a wire grid polarizer.

11. The color management system of claim 1, wherein said first analyzer comprises an optical polarizer.

12. The color management system of claim 1, wherein said modified first light beam has a first polarization orientation, and wherein said first analyzer comprises an optical retarder configured for substantially modifying said first polarization orientation.

13. The color management system of claim 1, wherein said first image assimilator comprises an optical retarder that exhibits an optical retardence.

14. The color management system of claim 13, wherein said optical retarder substantially compensating for a light beam emitted by said transmissive panel.

15. The color management system of claim 12, wherein said optical retarder is configured for substantially removing light of a predetermined wavelength from said modified first light beam.

16. The color management system of claim 1, wherein said first analyzer is positioned to receive said modified first light beam directly from said first image assimilator.

17. A color management system comprising:
    a first image assimilator comprising a first light separator;
    a first analyzer positioned to receive, from the first light separator, a first light beam comprising a first light image, said first analyzer configured for producing a first filtered light beam having an improved contrast relative to said first light beam;
    a second analyzer positioned to receive, from a second image assimilator, a second light beam comprising a second light image, said second analyzer configured for producing a second filtered light beam having an improved contrast relative to said second light beam;
    a light combiner positioned to receive said first filtered light beam and said second filtered light beam, said light combiner configured for producing a combined output beam comprising a combined light image including said first light image and said second light image; and an optical isolator positioned to receive said combined output beam, said optical isolator configured for substantially eliminating retroreflections of said combined output beam.

18. The color management system of claim 17, wherein said combined output beam has an initial polarization axis;
wherein said optical isolator is configured for emitting a substantially circularly polarized light beam comprising said combined light image;
wherein said optical isolator is further positioned to receive a reflected light beam comprising a reflection of said substantially circularly polarized light beam;
wherein said optical isolator is configured for emitting an orthogonally-rotated light beam having a polarization axis rotated approximately 90 degrees relative to said initial polarization axis.

19. The color management system of claim 17, wherein said optical isolator comprises an optical retarder.

20. The color management system of claim 18, further comprising a polarizing beamsplitter positioned to receive said orthogonally-rotated light beam.

21. The color management system of claim 20, wherein said polarizing beamsplitter comprises a wire grid polarizer.

22. The color management system of claim 17, wherein said light combiner comprises a dichroic beamsplitter.

23. The color management system of claim 17, wherein said light combiner comprises a Philips prism.

24. The color management system of claim 17, wherein said light combiner comprises a Plumbicon prism.

25. The color management system of claim 17, wherein said light combiner comprises a modified Philips prism.

26. The color management system of claim 17, wherein said light combiner comprises two or more channels.

27. The color management system of claim 17, wherein said light combiner comprises three or more channels.

28. The color management system of claim 17, wherein said light combiner comprises an x-prism.

29. The color management system of claim 28, wherein said x-prism is substantially optimized for operation under s-s-s polarization.

30. The color management system of claim 28, wherein said x-prism is substantially optimized for operation under p-p-p polarization.

31. The color management system of claim 28, wherein said x-prism is substantially optimized for operation under s-p-s polarization.

32. The color management system of claim 28, wherein said x-prism is substantially optimized for operation under p-s-p polarization.

33. The color management system of claim 28, wherein said x-prism is configured for recombining light transmissions that comprise substantially red, green and blue components.

34. The color management system of claim 28, wherein said x-prism comprises one or more dichroic filters.

35. The color management system of claim 28, wherein said x-prism comprises two or more dichroic filters.

36. The color management system of claim 28, wherein said x-prism comprises a polarizing beamsplitter.

37. The color management system of claim 17, wherein said first light separator is positioned to receive a light input comprising a first component and a second component, said first light separator configured for separating said first component from said second component and emitting said first light beam and said second light beam, said first light beam comprises said first component and said second light beam comprises said second component.

38. The color management system of claim 17, wherein said first light separator comprises a dichroic beamsplitter.

39. A color management system comprising:
a first image assimilator having a polarizing beamsplitter and a transmissive panel;
a first analyzer positioned to receive, from the polarizing beamsplitter of the first image assimilator, a first light beam comprising a first light image, said first analyzer configured for producing a first filtered light beam having an improved contrast relative to said first light beam; and
a second analyzer positioned to receive, from a second image assimilator, a second light beam comprising a second light image, said second analyzer configured for producing a second filtered light beam having an improved contrast relative to said second light beam.

40. The color management system of claim 39, wherein said polarizing beamsplitter comprises a wire grid polarizer.

41. The color management system of claim 17, wherein said first light separator is positioned to receive a dual light input comprising a first component and a second component, said light separator configured for separating said first component from said second component and emitting said first light beam comprising said first component.

42. The color management system of claim 17, wherein said first light separator comprises a dichroic prism.

43. The color management system of claim 17, wherein said first light separator comprises a dichroic prism and an optical retarder.

44. The color management system of claim 17, wherein said first light separator comprises a plate dichroic beamsplitter.

45. The color management system of claim 17, wherein said first light separator is configured for producing a red light output.

46. The color management system of claim 17, wherein said first light separator is configured for producing a cyan light output comprising green light and blue light.

47. The color management system of claim 17, wherein said first light separator comprises a polarizing beamsplitter.

48. The color management system of claim 47, wherein said polarizing beamsplitter is a wire grid polarizer.

49. The color management system of claim 41, further comprising:
a second light separator positioned to receive a light input prior to said first light separator; wherein said light input comprises said first component, said second component, and a third component; and wherein said second light separator is configured for separating said third component from said first component and said second component and for emitting said dual light input and a third light beam comprising said third component; and
an auxiliary image assimilator positioned to receive said third light beam; wherein said auxiliary image assimilator is further configured for emitting a modified third light beam; and wherein said modified third light beam comprises spatial information superimposed on said third light beam.

50. The color management system of claim 49, wherein said auxiliary image assimilator is further configured for substantially transmitting said third light beam to be received by a third display panel and for receiving said modified third light beam from said third display panel before emitting said modified third light beam.

51. A method for facilitating color management for a projection system, the method comprising the steps of:
- receiving, at a first location, a first light beam comprising first spatial information and first noise;
- receiving, at a second location, a second light beam comprising second spatial information and second noise;
- separating, at said first location, said first spatial information from said first noise;
- separating, at said second location, said second spatial information from said second noise;
- emitting, from said first location, a first filtered light output comprising said first spatial information, whereby said first filtered light output has an improved contrast relative to said first light beam;
- emitting, from said second location, a second filtered light output comprising said second spatial information, whereby said second filtered light output has an improved contrast relative to said second light beam;
- combining, at a third location, said first filtered light output and said second filtered light output to produce a combined light output;
- receiving, at a fourth location, said combined light output and a reflection of said combined light output; and
- removing said reflection from said combined light output.

52. A color management system comprising three or more image assimilators, three or more analyzers, a light beam combiner, and an optical isolator;
- wherein each said image assimilator comprises a transmissive panel configured for producing a light beam comprising a light image, waste light, and spatial information configured for distinguishing said light image from said waste light;
- wherein each said image assimilator further comprises a separator configured to separate substantially all of said waste light from said light image based at least in part on said spatial information, whereby, in each image assimilator, a modified light beam is produced comprising said light image;
- wherein each of said analyzers is positioned to receive, from an image assimilator, a modified light beam and is configured for producing a filtered light beam comprising said light image and having an improved contrast relative to said modified light beam;
- wherein said light beam combiner is positioned to receive said filtered light beams and is configured for producing a combined output beam comprising a combined light image including said light images; and
- wherein said optical isolator is positioned to receive said combined output beam and is configured for substantially eliminating retroreflections of said combined output beam.

\* \* \* \* \*